No. 753,728. PATENTED MAR. 1, 1904.
J. M. NYCE.
RECEPTACLE OF THE LADLE TYPE.
APPLICATION FILED NOV. 19, 1903.
NO MODEL.
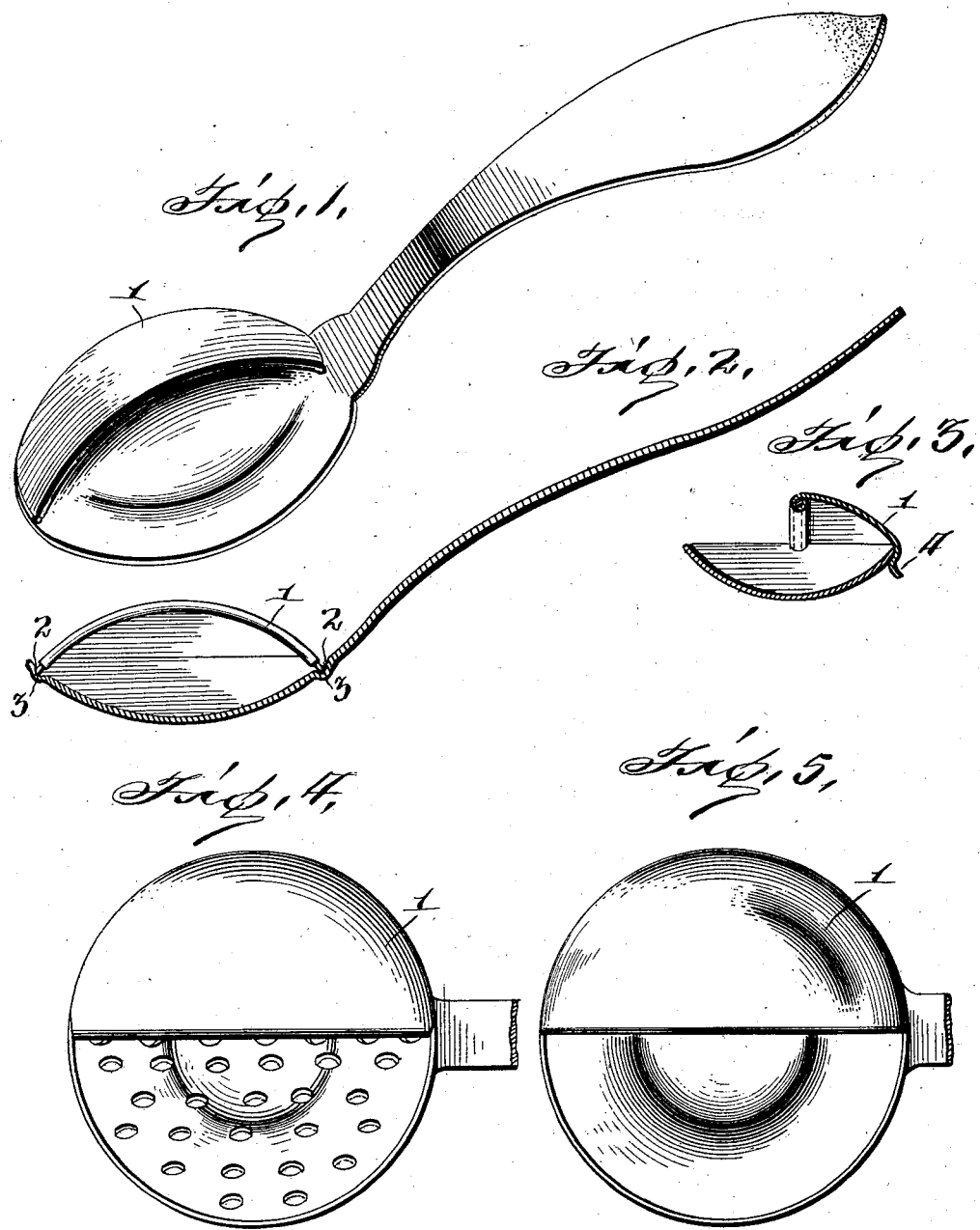
Witnesses
Jas. A. Koehl.
Inventor
J. M. Nyce,
By _____, Attorney No. 753,728. Patented March 1, 1904.

UNITED STATES PATENT OFFICE.

JOHN M. NYCE, OF EASTON, PENNSYLVANIA.

RECEPTACLE OF THE LADLE TYPE.

SPECIFICATION forming part of Letters Patent No. 753,728, dated March 1, 1904.

Application filed November 19, 1903. Serial No. 181,844. (No model.)

*To all whom it may concern:*

Be it known that I, JOHN M. NYCE, a citizen of the United States, residing at Easton, in the county of Northampton and State of Pennsylvania, have invented certain new and useful Improvements in Receptacles of the Ladle Type; and I do declare the following to be a full, clear, and exact description of the invention, such as will enable others skilled in the art to which it appertains to make and use the same.

My invention is an improved receptacle of the ladle type; and it consists in the construction and arrangement of devices hereinafter described and claimed.

The object of my invention is to provide an article of this character with a shield to partially cover one side of the bowl to prevent the contents from spilling out, and which is especially adapted for use in dining-cars, steamers, and the like, and is applicable to spoons, skimmers, and ladles.

In the accompanying drawings, Figure 1 is a perspective view of a spoon embodying my improvements. Fig. 2 is a longitudinal central sectional view taken through the bowl and showing the shield or cover. Fig. 3 is a transverse sectional view of the same. Fig. 4 is a plan view of a skimmer embodying my improvements. Fig. 5 is a similar view of a ladle.

In the embodiment of my invention I provide the bowl of a spoon, skimmer, or ladle with a cover 1, which is disposed over one side of the same and which serves by slightly inclining the bowl laterally to prevent the contents thereof from being spilled. As here shown, the cover, which is substantially crescent shape, having one edge curved to correspond with one curved side of the bowl of the receptacle and the other edge straight and disposed from end to end above the center of the bowl, is provided at its ends or corners with pivotal studs 2, which have their bearings in sockets 3, formed in the bowl of the spoon, skimmer, or ladle, so that the cover is thus pivotally connected to the bowl of the spoon, skimmer, or ladle. The cover, which is preferably made of spring metal, is formed at its outer edge and preferably at its center with a downturned catch 4, which is adapted to engage one side edge of the bowl of the spoon, skimmer, or ladle, and thereby secure the cover in a locked position thereon. This also enables the cover to be readily detached from the bowl of the spoon, skimmer, or ladle by first unfastening the catch and then unshipping the pivotal studs of the cover from the bearing-sockets of the bowl.

I do not desire to limit myself to the precise construction and arrangement of devices herein shown and described, as it is evident that modifications may be made without departing from the spirit of my invention.

Having thus fully described my invention, what I claim as new, and desire to secure by Letters Patent, is—

A receptacle of the ladle type having its bowl provided at opposite ends with bearing-sockets, said receptacle being further provided with a longitudinally outwardly bowed spring-cover having studs at its ends to engage said bearing-sockets, and having its outer edge curved to correspond with the shape of the bowl and provided with a catch to coact with said side of the bowl to secure the cover thereto, the studs of the cover forming pivots to permit the opening and closing of the cover over the bowl when the catch is disengaged from the bowl, and the resilience of the cover enabling said studs to be disengaged from the bearing-sockets.

In testimony whereof I have hereunto set my hand in presence of two subscribing witnesses.

JOHN M. NYCE.

Witnesses:
CHAS. B. BRUNNER,
JOHN BRUNNER.